(12) United States Patent
Gao et al.

(10) Patent No.: US 11,163,472 B2
(45) Date of Patent: Nov. 2, 2021

(54) METHOD AND SYSTEM FOR MANAGING STORAGE SYSTEM

(71) Applicant: EMC IP Holding Company LLC, Hopkinton, MA (US)

(72) Inventors: Jian Gao, Beijing (CN); Geng Han, Beijing (CN); Jibing Dong, Beijing (CN); Jamin Jianbin Kang, Beijing (CN); Hongpo Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 99 days.

(21) Appl. No.: 16/825,690

(22) Filed: Mar. 20, 2020

(65) Prior Publication Data

US 2020/0225861 A1 Jul. 16, 2020

Related U.S. Application Data

(63) Continuation of application No. 15/709,667, filed on Sep. 20, 2017, now Pat. No. 10,599,357.

(30) Foreign Application Priority Data

Sep. 23, 2016 (CN) .......................... 201610849476.1

(51) Int. Cl.
  *G06F 11/00* (2006.01)
  *G06F 3/06* (2006.01)
  (Continued)

(52) U.S. Cl.
  CPC ............ *G06F 3/0644* (2013.01); *G06F 3/061* (2013.01); *G06F 3/0607* (2013.01); *G06F 3/0619* (2013.01); *G06F 3/0665* (2013.01); *G06F 3/0689* (2013.01); *G06F 11/1076* (2013.01); *G06F 11/1084* (2013.01); *G06F 11/1088* (2013.01); *G06F 11/1092* (2013.01); *G06F 11/2094* (2013.01)

(58) Field of Classification Search
  CPC ............... G06F 11/1076; G06F 11/108; G06F 11/1084; G06F 11/1088; G06F 11/1092;
  (Continued)

(56) References Cited

U.S. PATENT DOCUMENTS 5,960,169 A * 9/1999 Styczinski .......... G06F 11/1076
    714/6.12
8,099,623 B1 * 1/2012 Li ....................... G06F 11/1084
    714/6.22

(Continued)

FOREIGN PATENT DOCUMENTS

CN      1247608 A    3/2000
CN      1679000 A   10/2005
(Continued)

*Primary Examiner* — Marc Duncan
(74) *Attorney, Agent, or Firm* — BainwoodHuang

(57) ABSTRACT

A method and system for managing a storage system, the method comprising: creating a storage system including a first number of stripes, wherein each of the first number of stripes includes a second number of extents, and each of the second number of extents is distributed over a different storage device in a group of storage devices; with respect to a stripe among the first number of stripes, generating stripe information descriptive of a mapping relation between the second number of extents included in the stripe and the different storage devices in the group of storage devices; and with respect to a storage device where an extent among the second number of extents is located, building extent information about a mapping relation between an extent in the storage device and the stripe. In one embodiment of the present invention, there is provided a corresponding device and system.

18 Claims, 13 Drawing Sheets

(51) Int. Cl.
*G06F 11/10* (2006.01)
*G06F 11/20* (2006.01)

(58) Field of Classification Search
CPC ............ G06F 11/1658; G06F 11/2053; G06F 11/2094; G06F 3/0689; G06F 2211/1057–1064
See application file for complete search history.

(56) References Cited

U.S. PATENT DOCUMENTS

| | | | |
|---|---|---|---|
| 8,677,063 B2 * | 3/2014 | Becker-Szendy | G06F 11/1076 711/114 |
| 9,389,975 B2 * | 7/2016 | Arakawa | G06F 3/0689 |
| 10,146,640 B2 * | 12/2018 | Dudgeon | G06F 11/1435 |
| 10,282,260 B2 * | 5/2019 | Lee | G06F 11/1441 |
| 10,296,237 B2 * | 5/2019 | Klemm | G06F 3/0607 |
| 2013/0003211 A1 * | 1/2013 | Kawaguchi | G06F 11/1092 360/39 |
| 2013/0047028 A1 * | 2/2013 | Daikokuya | G06F 11/0727 714/6.3 |
| 2018/0095676 A1 * | 4/2018 | Zhao | G06F 11/1076 |

FOREIGN PATENT DOCUMENTS

| | | |
|---|---|---|
| CN | 101526882 A | 9/2009 |
| CN | 101576833 A | 11/2009 |
| CN | 102508733 A | 6/2012 |
| CN | 103136116 A | 6/2013 |
| CN | 104142872 A | 11/2014 |
| CN | 105068896 A | 11/2015 |

\* cited by examiner

METHOD AND SYSTEM FOR MANAGING STORAGE SYSTEM

CROSS-REFERENCE TO RELATED APPLICATIONS

This application is a continuation of copending U.S. patent application Ser. No. 15/709,667, filed Sep. 20, 2017, which claims priority to Chinese Patent Application Number CN201610849476.1, filed on Sep. 23, 2016 at the State Intellectual Property Office, China. The contents of both prior applications are incorporated herein by reference.

FIELD

Various embodiments of the present invention relate to storage management, and more specifically, to a method and system for managing a storage system (e.g. Redundant Array of Independent Disks, RAID).

BACKGROUND

With the development of data storage techniques, various data storage devices now provide users with higher and higher data storage capacity, and also their speed of accessing data has been increased greatly. So far various RAID-based data storage systems have been developed to increase data reliability. When one or more disks in a storage system fail, a new standby disk needs to be introduced into the storage system, and data in failing disks can be recovered from data in other disks operating normally.

During data recovery, recovered data needs to be written to the backup disk. Due to bandwidth limitation of a data interface of the standby disk, when a large amount of data needs to be recovered, the time for data recovery might amount to several hours and even a couple of days. As the storage capacity of the storage system increases constantly, the time for data recovery might reach an unbearable degree. At this point, how to reduce the time for data recovery and further improve performance of the storage system becomes a focus for research.

SUMMARY

Therefore, it is desirable to develop and implement a technical solution for managing a storage system and improving performance of the storage system. It is desired that the technical solution can be compatible with existing storage systems and manage them in a more secure and reliable way without any extra hardware devices added to existing storage systems.

In one embodiment of the present invention, there is provided a method for managing a storage system, the method comprising: creating a storage system including a first number of stripes, each of the first number of stripes including a second number of extents, each of the second number of extents being distributed over a different storage device in a group of storage devices; with respect to a stripe among the first number of stripes, generating stripe information descriptive of a mapping relation between the second number of extents included in the stripe and the different storage devices in the group of storage devices; and with respect to a storage device where an extent among the second number of extents is located, building extent information about a mapping relation between an extent in the storage device and the stripe.

In one embodiment of the present invention, there is provided a system for managing a storage system, the system comprising: one or more processors; a memory coupled to at least one processor of the one or more processors; computer program instructions stored in the memory which, when executed by the at least one processor, cause the system to execute a method for managing a storage system, the method comprising: creating a storage system including a first number of stripes, each of the first number of stripes including a second number of extents, each of the second number of extents being distributed over a different storage device in a group of storage devices; with respect to a stripe among the first number of stripes, generating stripe information descriptive of a mapping relation between the second number of extents included in the stripe and the different storage devices in the group of storage devices; and with respect to a storage device where an extent among the second number of extents is located, building extent information about a mapping relation between an extent in the storage device and the stripe.

With the technical solution of the present invention, a storage system can be managed in a more convenient manner, and further response efficiency and stability of the storage system improved.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
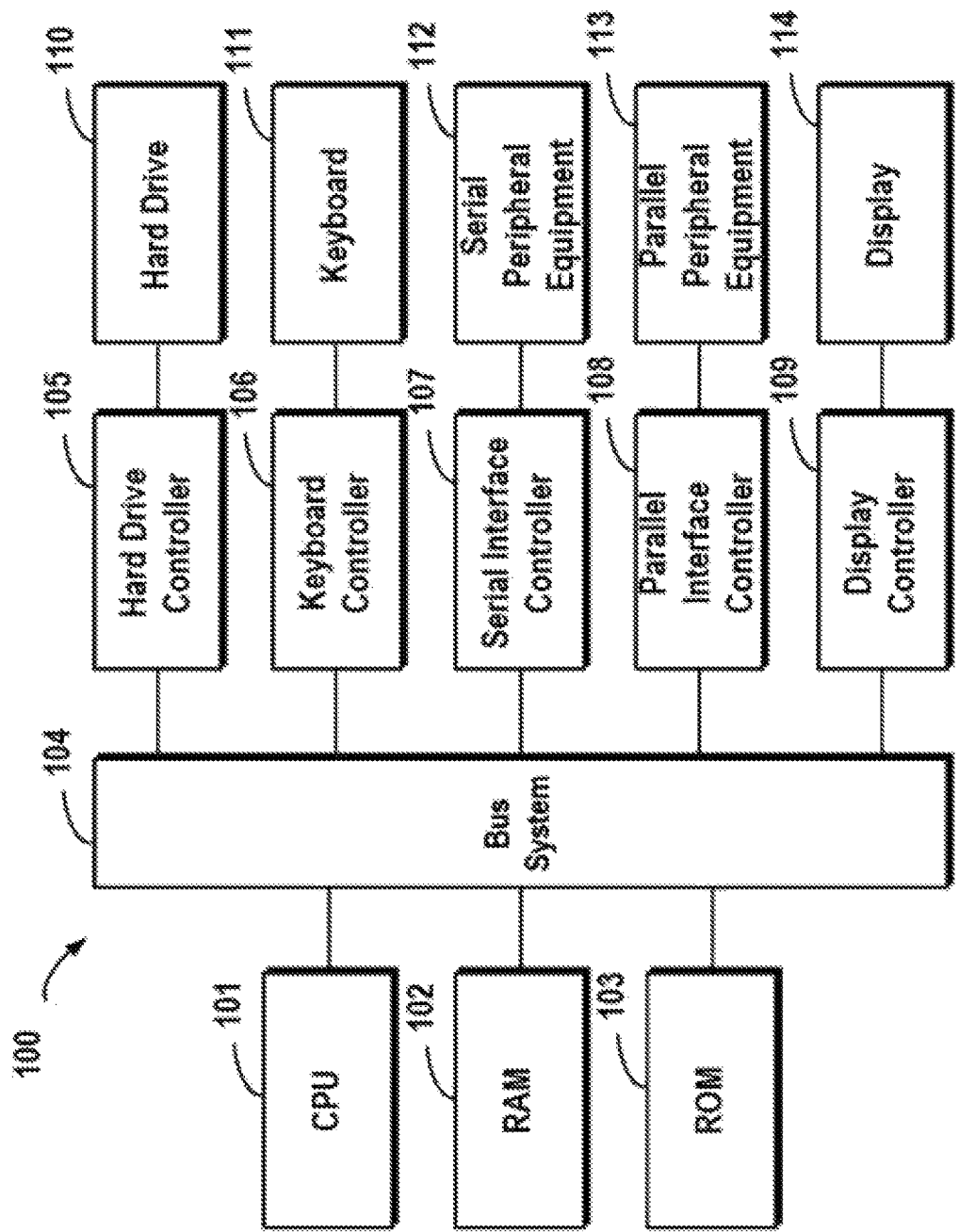
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those skilled in the art should understand that illustrated above is just a typical example of an application environment where the various embodiments of the present invention can be implemented. Throughout the context of the present invention, the various embodiments of the present invention may be implemented in various application environments that are known already or to be developed later.

In a storage system such as Redundant Array of Independent Disks (RAID), multiple storage devices (e.g. disks) may be combined into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc.

For more details about RAID levels, those skilled in the art may refer to https://en.wikipedia.org/wiki/Standard_RAID_levels and https://en.wikipedia.org/wiki/Nested_RAID_levels, etc. The operating system may consider a disk array, consisting of multiple storage devices, as a single logical storage unit or disk. By partitioning the disk array into multiple stripes, data may be distributed across multiple storage devices, so that low delay and high bandwidth is achieved, and data can be recovered to some degree when some disks are broken.

Figure 2A:
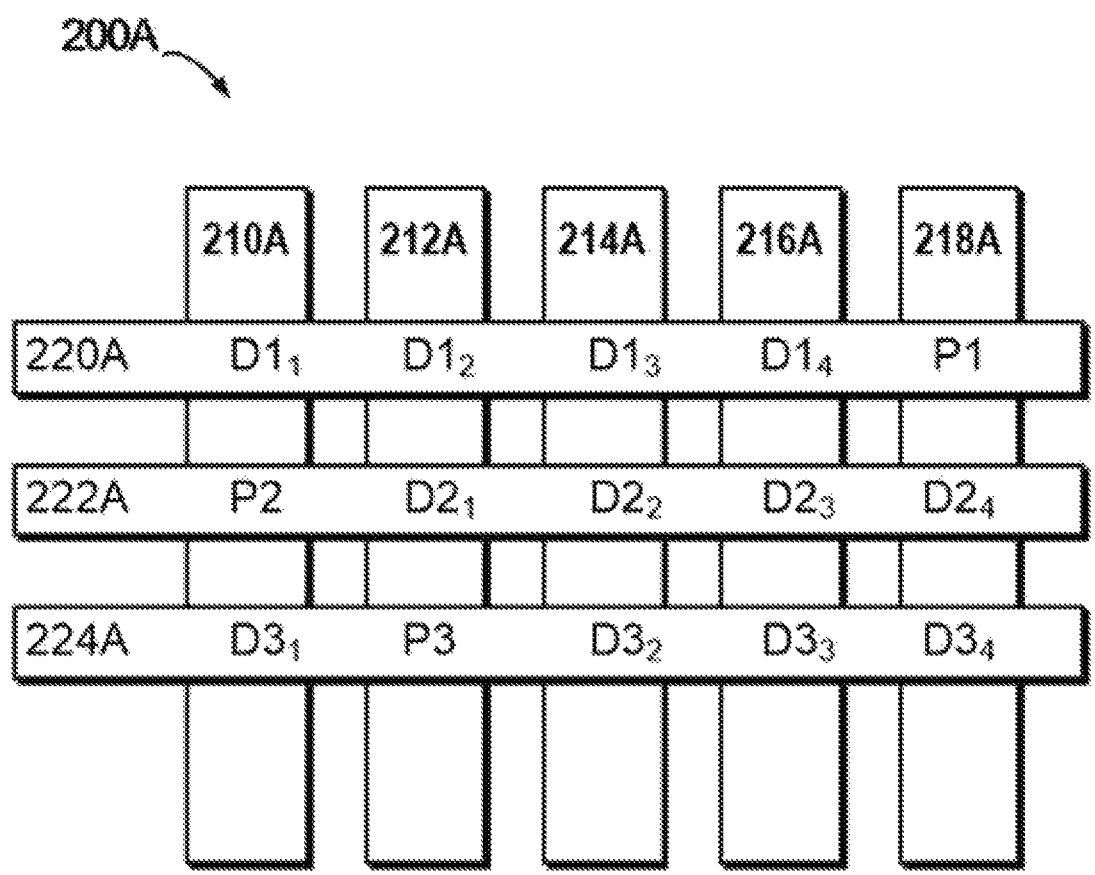
FIG. 2A schematically illustrates a schematic view of a structure of a Redundant Array of Independent Disks according to one technical solution, and FIG. 2B schematically illustrates a schematic view of rebuilding process of a Redundant Array of Independent Disks according to one technical solution.

FIG. 2A schematically illustrates a schematic view 220A of a structure of RAID according to one technical solution. In this figure, working principles of RAID are illustrated by taking RAID-5 that consists of five independent storage devices (210A, 212A, 214A, 216A and 218A) as an example. It should be noted although five storage devices are schematically shown in FIG. 2A, in other embodiments more or less storage devices may be comprised according to different versions of RAID. Moreover, although in FIG. 2A there are shown stripes 220A, 222A and 224A, in other examples the RAID system may further comprise different numbers of stripes.

In RAID, one stripe crosses multiple physical storage devices (for example, the stripe 220A crosses storage the devices 210A, 212A, 214A, 216A and 218A). The stripe may be simply construed as a storage area among multiple storage devices which satisfies a given address range. Data stored in the stripe 220 comprises multiple parts: a data block $D1_1$ stored in the storage device 210A, a data block $D1_2$ stored in the storage device 212A, a data block $D1_3$ stored in the storage device 214A, a data block $D1_4$ stored in the storage device 216A, and a data block P1 stored in the storage device 218A. In this example, data blocks $D1_1$, $D1_2$, $D1_3$ and $D1_4$ are stored data, and data block P1 is a checksum of the stored data.

The mode of storing data in other stripes is similar to that in the stripe 220A, and the difference is that a checksum about other data block may be stored in other storage device than the storage device 218A. In this way, when one of the multiple storage devices 210A, 212A, 214A, 216A and 218A fails, data in the failing device may be recovered from other normal storage devices.

Figure 2B:
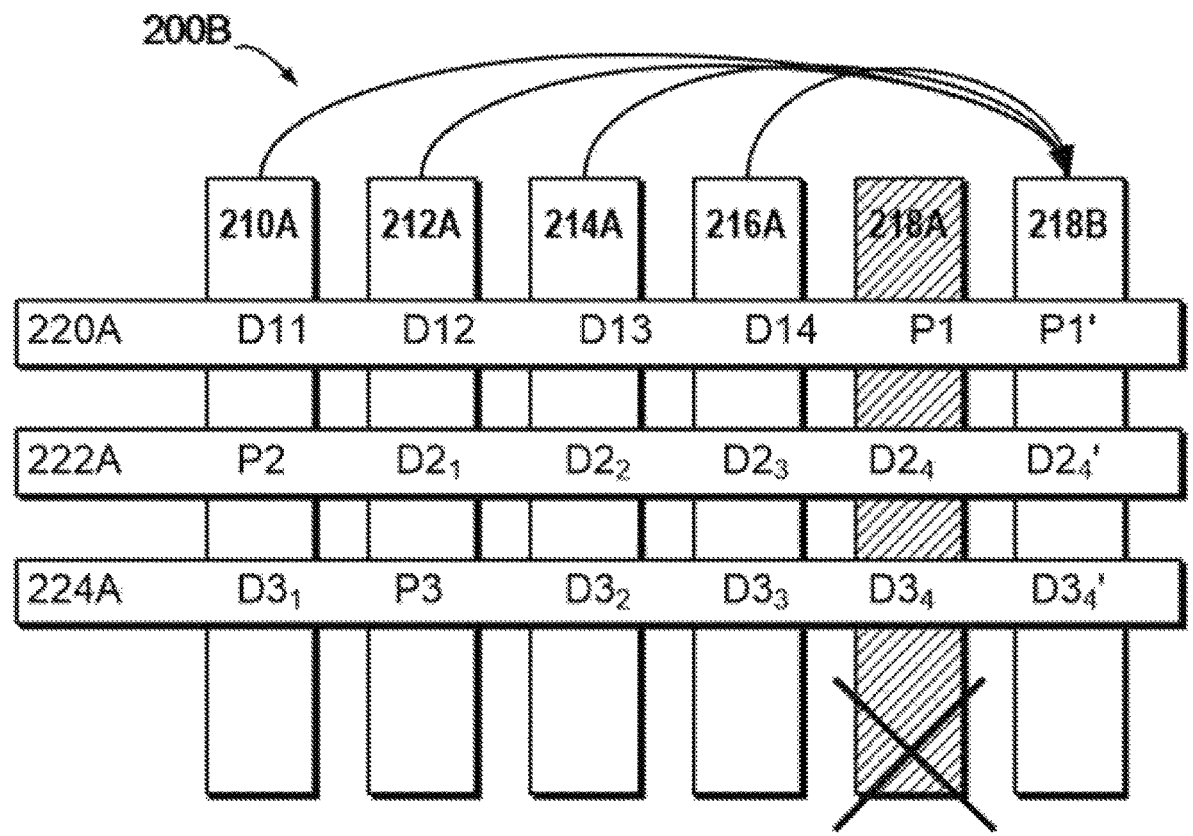

FIG. 2B schematically illustrates a schematic view 220B of rebuilding process of RAID according to one technical solution. As shown in FIG. 2B, when one storage device (e.g. the storage device 218A shown in shadow) fails, data may be recovered from the other storage devices 210A, 212A, 214A and 216A that operate normally. At this point, a new standby storage device 218B may be added to RAID to replace the storage device 218A. In this way, recovered data may be written to the storage device 218B, and system rebuilding may be realized. Though both the systems shown in FIGS. 2A and 2B use one storage device to store P parity (R5 RAID), in an R6 RAID system further two storage devices may be used to store P parity and Q parity respectively.

In the rebuilding process of the storage system, when data is written to the storage device 218B, the write speed is limited by the write bandwidth of the storage device, and thus a long recovery time is required. On the other hand, when the storage devices 210A to 218A operate normally, the storage device 218B is in a free state and its storage space cannot be utilized, so a waste of storage resources is caused.

A technical solution for mapped RAID has been proposed. In the technical solution, a storage device (e.g. the storage devices 210A to 218A shown in FIG. 2A, and the storage devices 210A to 218A and 218B shown in FIG. 2B) may be a virtual storage device, and the storage space therein may be located in different physical storage devices. In this way, when recovery operation is performed, data may be concurrently written to multiple physical storage devices associated with the virtual storage device 218B respectively, and thus the recovery speed is increased.

Though mapped RAID divides a physical storage device into multiple extents and offers higher flexibility and faster recovery speed for the management of the storage system, existing solutions operate on a multilayered data structure, which makes the management process complicated and difficult to implement.

In view of the above drawbacks in the prior art, the present invention proposes a method for managing a storage system. The method comprises: creating a storage system including a first number of stripes, each of the first number of stripes including a second number of extents, and each of the second number of extents being distributed over a different storage device in a group of storage devices; with respect to a stripe among the first number of stripes, generating stripe information descriptive of a mapping relation between the second number of extents included in the stripe and the different storage devices in the group of storage devices; and with respect to a storage device where an extent among the second number of extents is located, building extent information about a mapping relation between an extent in the storage device and the stripe. With the technical solution of the present invention, the storage system can be conveniently managed based on the stripe information and the extent information.

Figure 3:
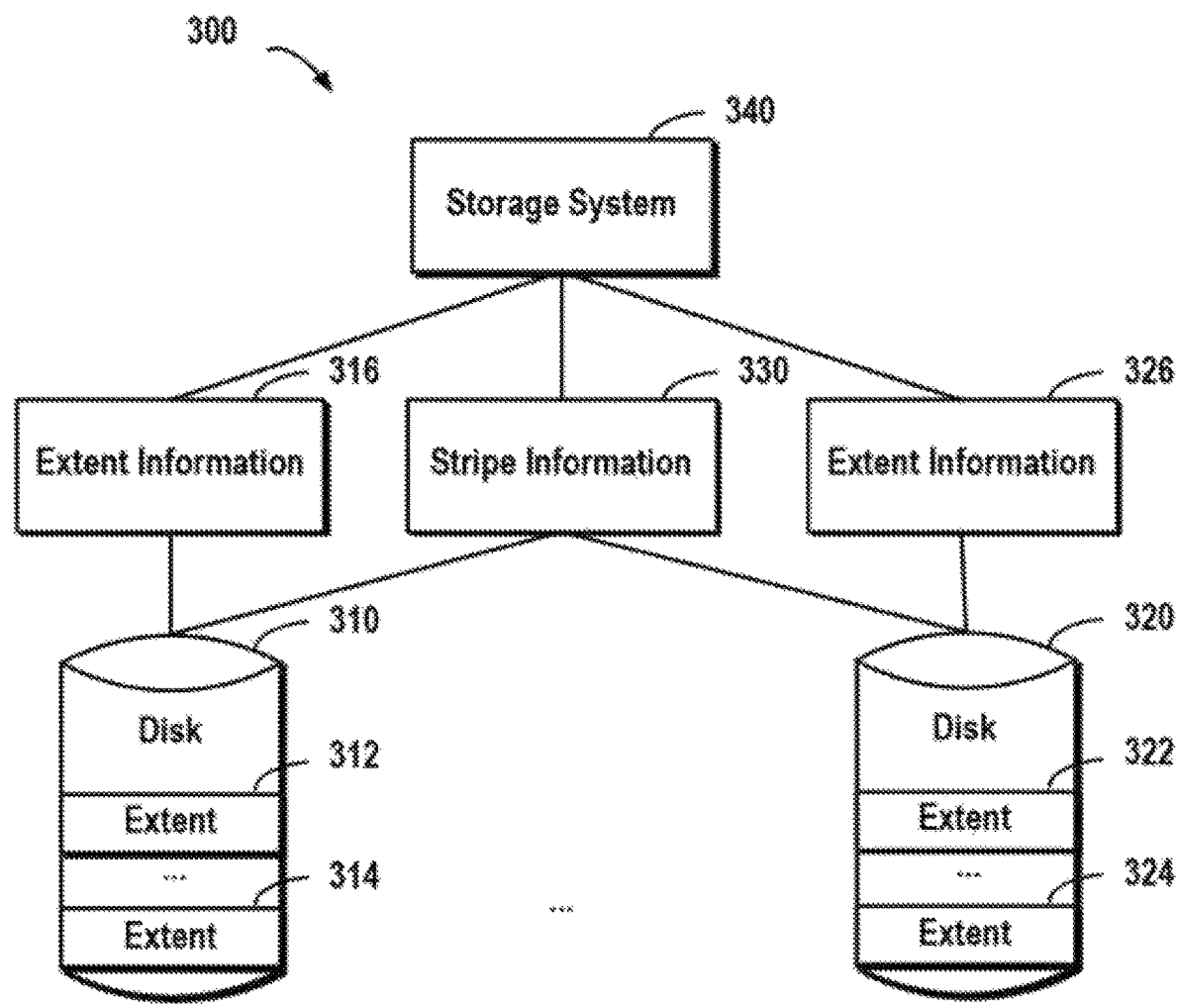
FIG. 3 schematically illustrates a schematic view of a method for managing a storage system according to one technical solution.

FIG. 3 shows a schematic view 300 of a method for managing a storage system according to one technical solution. As shown in this figure, a storage system 340 may be implemented based on multiple physical storage devices 310, . . . , 320, and each physical storage device may include multiple extents. For example, the disk 310 may include multiple extents 312, . . . , 314, and the disk 320 may include multiple extents 322, . . . , 324. In this way, the created storage system (e.g. RAID storage system) may include a first number of stripes, each of which includes a second number of extents each being distributed over a different disk in a group of disks. This is similar to existing mapped RAID systems.

Unlike existing technical solutions, in the embodiments of the present invention, extent information is separately built with respect to each disk being involved. For example, regarding the disk 310, extent information 316 may be built for storing a mapping relation between extents (e.g. the extents 312, ..., 314) in the disk 310 and stripes in the storage system 340. Specifically, each entry in the extent information 316 may record each extent is referenced by which stripe in the storage system 340. Similarly, extent information 326 may be built for storing a mapping relation between extents (e.g. the extents 322, ..., 324) in the disk 320 and stripes in the storage system 340.

In addition, with respect to each stripe in the storage system 340, stripe information 330 descriptive of a mapping relation between extents included in the stripe and the different disks (e.g., the disks 310, ..., 320) may be generated. In this embodiment, an entry for each stripe in the stripe information 330 may record an address of an extent corresponding to each position in the entry. By means of the management architecture as shown in FIG. 3, the storage system 340 can be conveniently managed based on the extent information 316, 326 as well as the stripe information 330. With reference to the accompanying drawings, detailed description is presented below to how to build extent information and stripe information as well as how to manage a storage system based on the above mentioned information.

Figure 4:
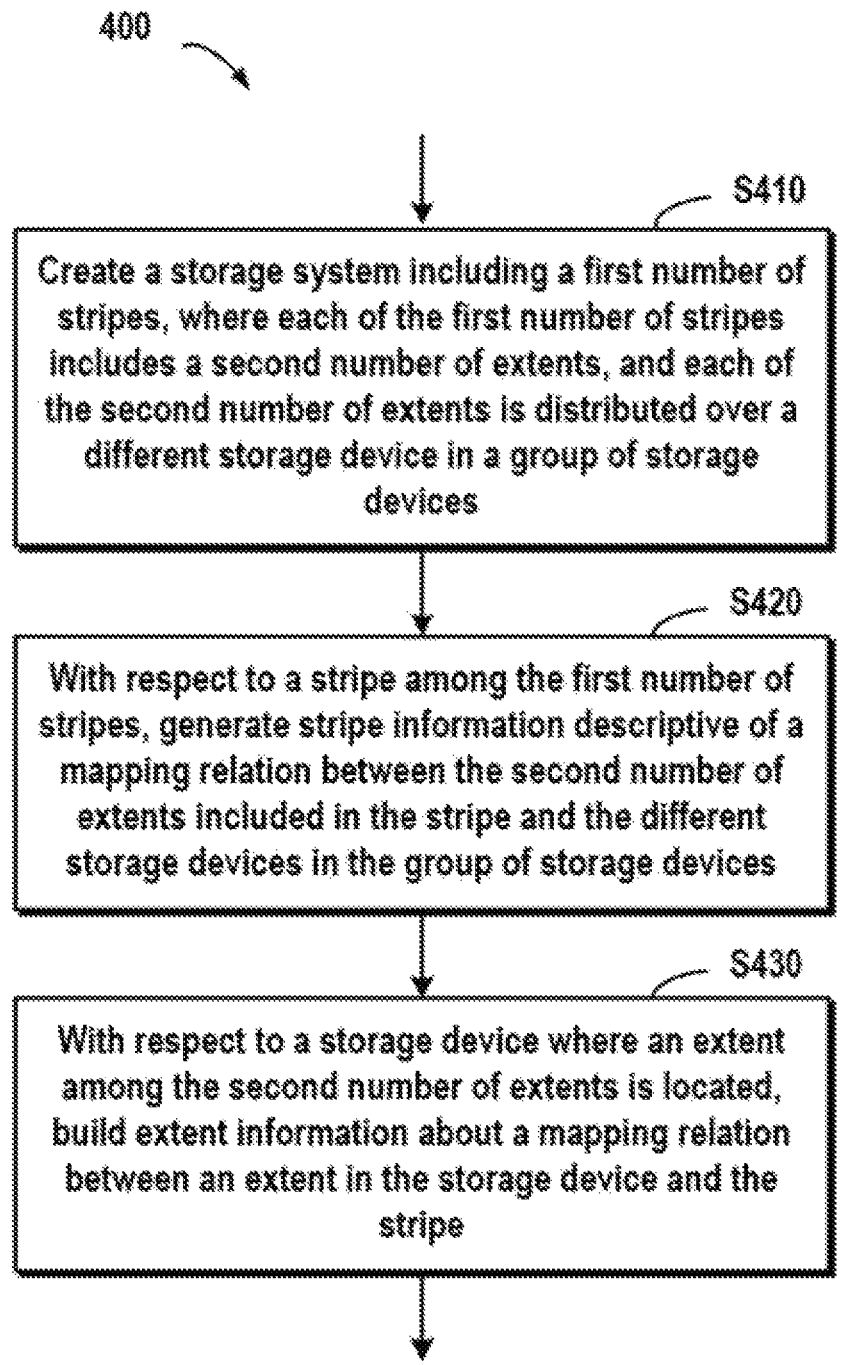
FIG. 4 schematically illustrates an architecture view of a technical solution for managing a storage system according to one embodiment of the present invention.

FIG. 4 schematically shows an architecture view 400 of a technical solution for managing a storage system according to one embodiment of the present invention. In step S410, a storage system including a first number of stripes is created, where each stripe among the first number of stripes includes a second number of extents, and each of the second number of extents is distributed over a different storage device in a group of storage devices. In this step, those skilled in the art may define the size of an extent and the number of stripes (i.e. the first number). Moreover, as a standard being adopted varies, the number of disks involved in a stripe varies too. For example, in a 6+2 R6 RAID system, 6 disks are for storing data, and the other 2 disks are for storing P and Q parity respectively. In a 3+2 R6 RAID system, each stripe may involve 5 disks, among which 3 are for storing data and the other 2 are for storing P and Q parity respectively. In a 4+1 R5 RAID system, 4 disks are for storing data, and the remaining 1 disk is for storing P parity.

In step S420, with respect to a stripe among the first number of stripes, stripe information descriptive of a mapping relation between the second number of extents included in the stripe and the different storage devices in the group of storage devices is generated. In this embodiment, the storage system may involve multiple stripes, and each stripe may include multiple (e.g. second number of) extents distributed over different storage devices. In the 6+2 R6 RAID system, 8 extents distributed over 8 different disks may be involved. At this point, the stripe information may be for recording a mapping relation between the stripe and each extent among the 8 extents, i.e. physical positions of the 8 extents in the stripe.

In step S430, with respect to a storage device where an extent among the second number of extents is located, extent information about a mapping relation between an extent in the storage device and the stripe is built. In this step, with respect to a storage device where each extent in the stripe is located, a mapping relation between a specific extent in the storage device and a stripe associated with the specific extent may further be recorded. For example, continuing the example in step S420, regarding a first extent in the 8 extents in the stripe, suppose the extent's physical position is: (disk 1, address 1), then extent information built at this point may include by which stripe in the storage system all (or part of) extents in disk 1 are referenced. In this embodiment, the built extent information and stripe information may be served as a basis for managing the storage system.

Note in the data center there may be included multiple (e.g. hundreds of) storage devices so as to provide customized RAID storage systems to different users. At this point, multiple storage devices in the data center may simultaneously serve different RAID storage systems. In order to balance workloads of the multiple storage devices, it is desired extents involved in each RAID storage system may be uniformly distributed over the multiple storage devices as far as possible.

In one embodiment of the present invention, the creating a storage system including a first number of stripes comprises: with respect to each stripe among the first number of stripes, selecting a second number of storage devices from the group of storage devices such that the selected second number of storage devices are uniformly distributed over the group of the storage devices; and selecting one extent from each storage device among the second number of storage devices.

Continue the foregoing example, with respect to each stripe in the storage system, 8 storage devices may be selected from multiple storage devices in the data center, and one extent is selected from each storage device. In this embodiment, the selected 8 storage devices need to be uniformly distributed over multiple storage devices in the data center. For example, for each stripe, 8 storage devices may be randomly selected, at which point with the increase of stripes, storage devices in the data center are selected substantially same times. For another example, the selection may further be made based on the number of used extents in multiple storage devices so as to ensure the percentage of used extents in each storage devices to be substantially same and further ensure loads of multiple storage devices to be balanced.

Figure 5:
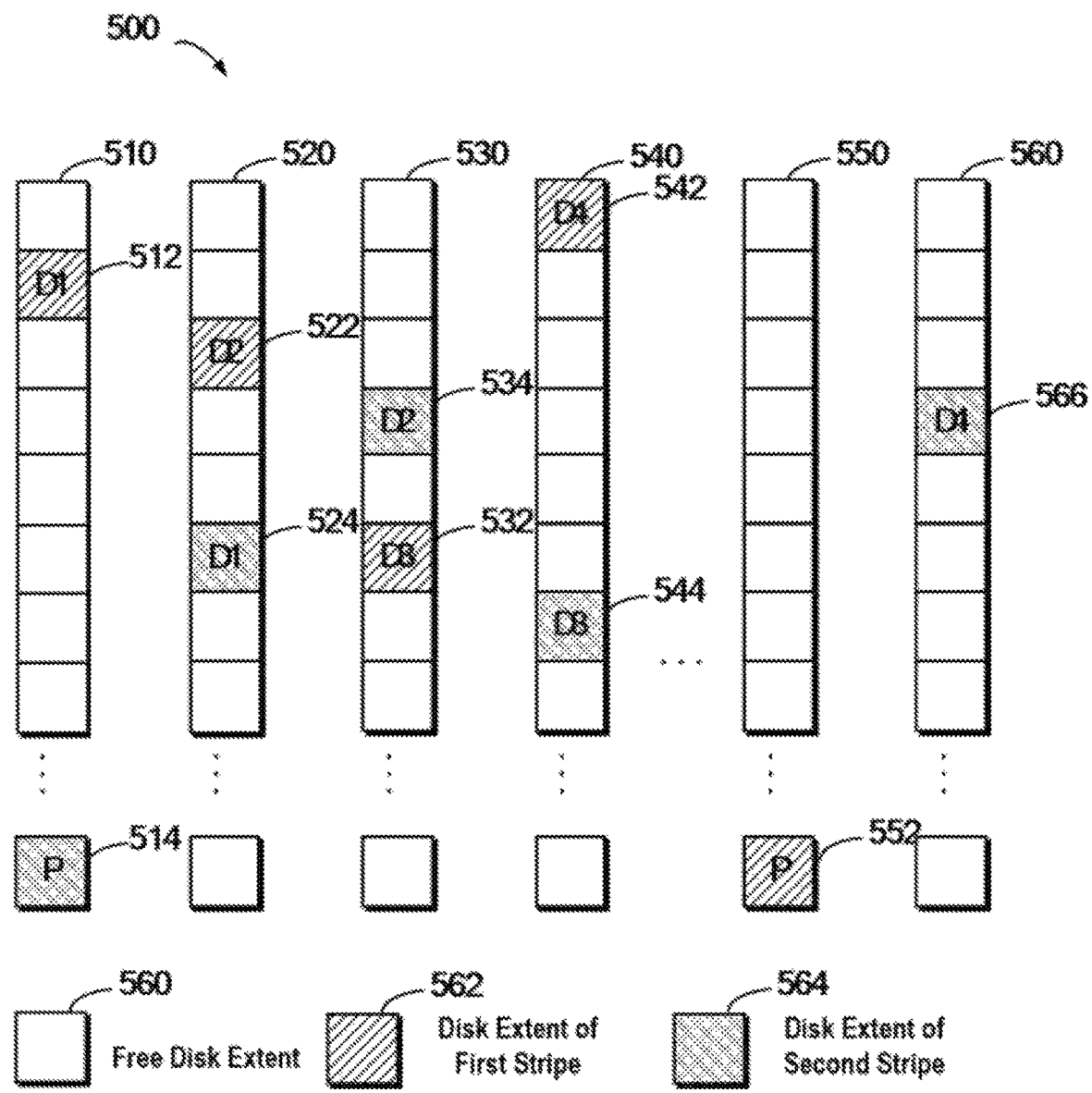
FIG. 5 schematically illustrates a schematic view of selecting extents for a stripe from a group of disks according to one embodiment.

FIG. 5 schematically shows a schematic view 500 of selecting extents for a stripe from a group of disks according to one embodiment of the present invention. This figure illustrates multiple storage devices 510, 520, 530, 540, ..., 550, 560. Each storage device may include multiple extents, where a blank extent 560 represents a free disk extent, an extent 562 shown with stripes represents a disk extent for a first stripe, and an extent 564 shown in shade represents a disk extent for a second stripe. At this point, disk extents 512, 522, 532, 542 and 552 for the first stripe are for storing data blocks D1, D2, D3, D4 and parity P of the first stripe respectively; disk extents 524, 534, 544, 566 and 514 for the second stripe are for storing data blocks D1, D2, D3, D4 and parity P of the second stripe respectively.

Note in FIG. 5 the 4+1 R5 RAID storage system is taken as an example to illustrate how extents in various stripes are uniformly distributed over multiple storage systems in the data center. When RAID based on other standard is used, those skilled in the art may implement concrete details based on the above described principles. For example, in the 6+2 R6 RAID storage system, 8 extents in each stripe may be uniformly distributed over multiple storage devices so as to ensure a load balance between the multiple storage devices.

Figure 6A:
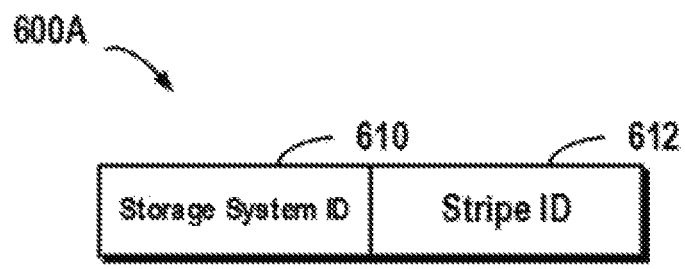
FIGS. 6A, 6B and 6C each schematically illustrate a block diagram of a data structure of extent information according to one embodiment.
Figure 6B:
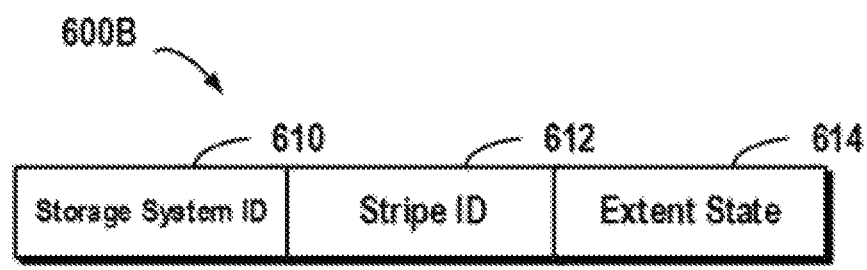
Figure 6C:
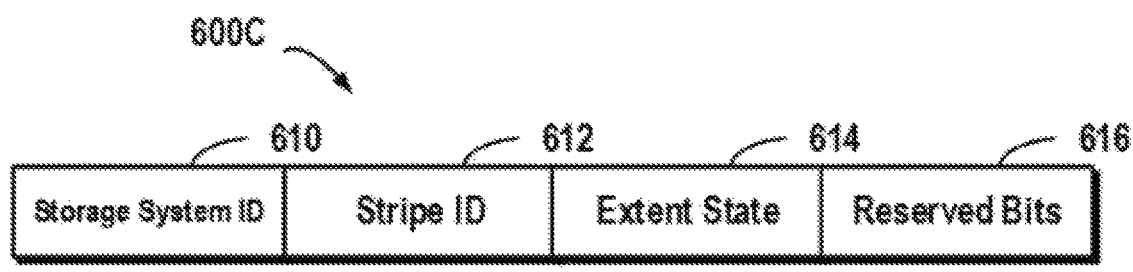

FIGS. 6A, 6B and 6C schematically show block diagrams 600A, 600B and 600C of a data structure of extent information according to one embodiment respectively. As shown in FIG. 6A, extent information for an extent may comprise: a storage system ID 610 (e.g. 4 bits), indicating by which storage system the extent is being referenced; and a stripe ID (e.g. 24 bits), indicating by which stripe in the storage system the extent is being referenced. Though not shown in FIG. 6A, the extent information may further comprise an extent ID for uniquely indicating the extent.

Where one storage device comprises multiple extents, extent information for extents may be stored in the storage device in order. At this point, the order of extent information may be consistent with the order of addresses in the storage device, so the extent ID field may be omitted. In this example, the entry for a first extent is in a first position, the entry for a second extent is in a second position, and so on and so forth. Table 1 schematically shows an example of extent information for a storage device below.

TABLE 1

Example of Extent Information

| Storage System ID | Stripe ID |
|---|---|
| RAID_1 | Stripe_1 |
| RAID_2 | Stripe_2 |
| ... | ... |

Besides the above mapping relation between an extent in the storage device and the stripe, the extent information may further comprise a state of the extent. In one embodiment of the present invention, the building, with respect to a storage device where an extent among the second number of extents is located, extent information about a mapping relation between an extent in the storage device and the stripe further comprises: adding state information of the extent to the extent information.

FIG. 6B schematically shows a block diagram 600B of a data structure of extent information according to one embodiment. Besides the fields 610 and 612 shown in FIG. 6A, in this embodiment the extent information further comprises an extent state 614 (e.g. 4 bits). An extent may have various states:

FBE_EXTENT_POOL_DISK_EXTENT_STATE_FREE, representing the extent is in a free state;

FBE_EXTENT_POOL_DISK_EXTENT_STATE_CONSUMED, representing the extent has been consumed, for example, by the storage system and the stripe indicated by the fields 610 and 612 respectively;

FBE_EXTENT_POOL_DISK_EXTENT_STATE_EOL, representing the extent has a potential failure and face the end of life; and FBE_EXTENT_POOL_DISK_EXTENT_STATE_DEAD, representing the extent has been dead.

An example of possible states of an extent has been illustrated above. Those skilled in the art may set other state indicator according to needs of a concrete application environment. FIG. 6C schematically shows a block diagram 600C of a data structure of extent information according to one embodiment. Besides the fields 610, 612 and 614 shown in FIG. 6B, in this embodiment the extent information further comprises reserved bits (e.g. 32 bits) for future extension.

Note as examples of fields of a data structure for saving extent information have been illustrated above, those skilled in the art may further store extent information with a data structure and other bit length based on the above principles. Further note though in the above example extent information associated with an extent among extents in a storage device is stored in the storage device, the extent information may further be stored in other position.

Figure 7A:
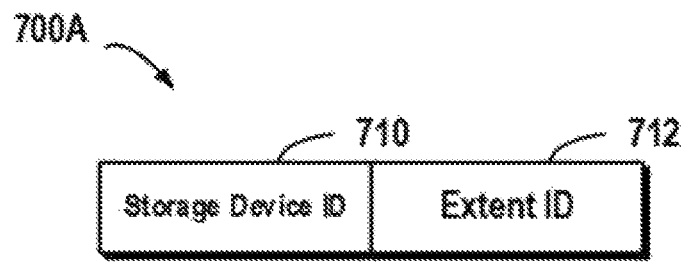
FIGS. 7A, 7B and 7C each schematically illustrate a block diagram of a data structure of an entry in stripe information according to one embodiment.
Figure 7B:
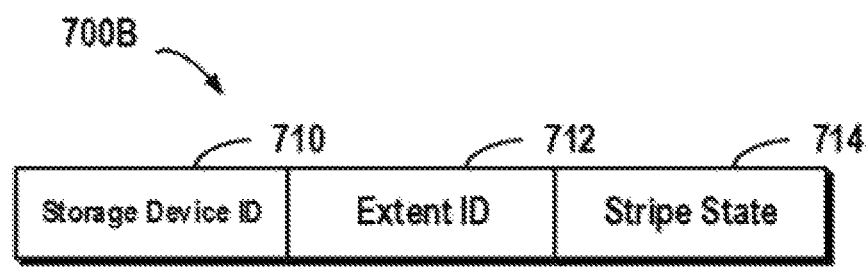
Figure 7C:
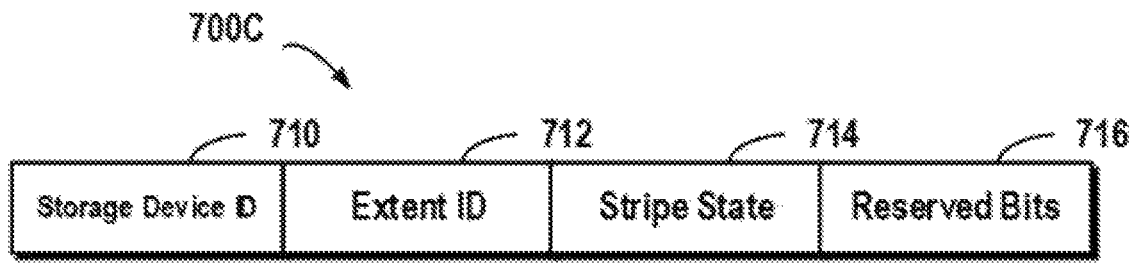

FIGS. 7A, 7B and 7C schematically show block diagrams 700A, 700B and 700C of a data structure of one entry in extent information according to one embodiment respectively. Since one stripe may comprise multiple positions, FIG. 7A schematically shows stripe information about one position. As shown in FIG. 7A, stripe information for one stripe may comprise: storage device ID 710 (e.g. 11 bits) for indicating ID of a storage device where a physical storage area in the position of the stripe is located; and extent ID (e.g. 17 bits) for indicating in which extent of the storage device the physical storage area in the position of the stripe is located. Though not shown in FIG. 7A, the stripe information may further comprise ID of a stripe, for uniquely indicating the stripe. Table 2 schematically shows an example of stripe information for one stripe below.

TABLE 2

Example of Stripe Information

| Storage Device ID | Extent ID |
|---|---|
| DISK_1 | Extent_1 |
| DISK_2 | Extent_2 |
| ... | ... |

Besides the above mapping relation between a stripe in the storage device and an extent in the storage device, the stripe information may further comprise a state of the stripe. In one embodiment of the present invention, the generating, with respect to a stripe among the first number of stripes, stripe information descriptive of a mapping relation between the second number of extents included in the stripe and the different storage devices in the group of storage devices further comprises: adding state information of the stripe to the stripe information.

FIG. 7B schematically shows a block diagram 600B of a data structure of one entry in stripe information according to one embodiment. Besides the fields 710 and 712 shown in FIG. 7A, in this embodiment the stripe information further comprises a stripe state 714 (e.g. 3 bits). A stripe may have various states:

FBE_EXTENT_POOL_EXTENT_STATE_INVALID, representing the stripe is invalid;

FBE_EXTENT_POOL_EXTENT_STATE_NM, representing the stripe is in a normal state;

FBE_EXTENT_POOL_EXTENT_STATE_RL, representing the stripe is in a registration restoring state;

FBE_EXTENT_POOL_EXTENT_STATE_RB, representing the stripe is in a rebuilding state; and FBE_EXTENT_POOL_EXTENT_STATE_CP, representing the stripe is in a copy state.

An example of possible states of a stripe has been illustrated above. Those skilled in the art may set other state indicator according to needs of a concrete application environment. FIG. 7C schematically shows a block diagram 700C of a data structure of stripe information according to one embodiment. Besides the fields 710, 712 and 714 shown in FIG. 7B, in this embodiment the stripe information further comprises reserved bits 616 (e.g. 33 bits) for future extension. Note as examples of fields of a data structure for saving stripe information have been illustrated above, those skilled in the art may further store stripe information with another data structure and another bit length based on the above principles.

Figure 8:
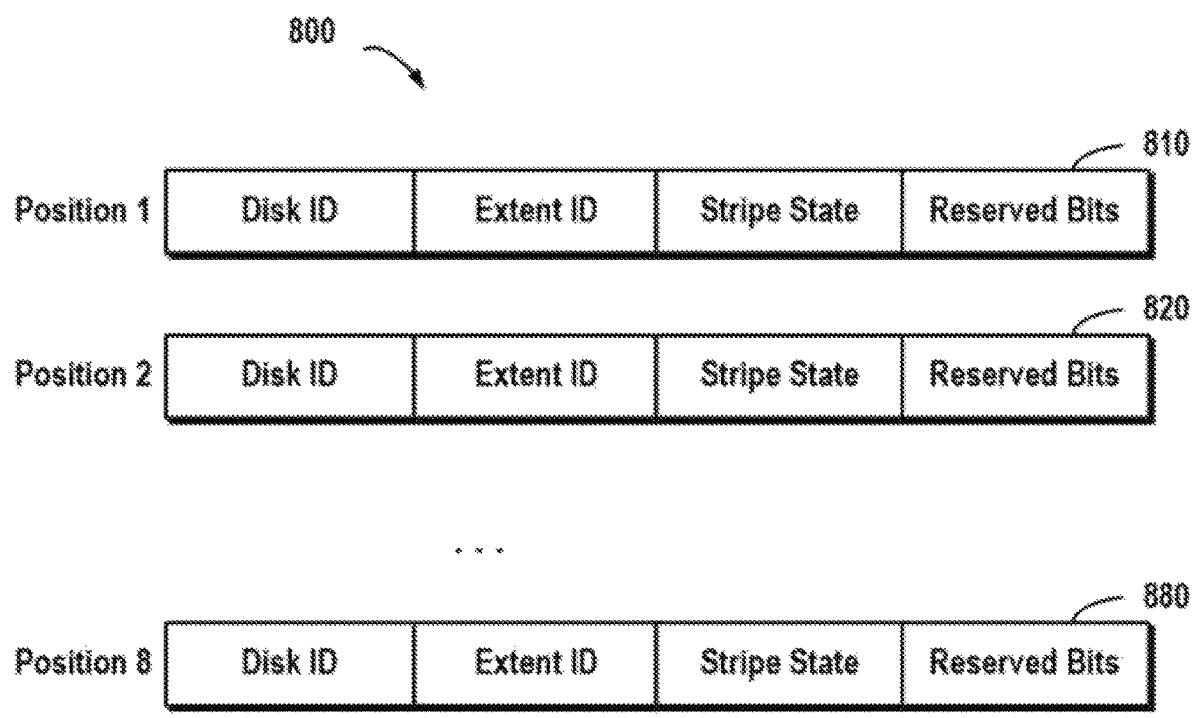
FIG. 8 schematically illustrates a block diagram of a data structure of stripe information according to one embodiment.

FIG. 8 schematically shows a block diagram 800 of a data structure of stripe information according to one embodiment. Continue the above example of the 6+2 R6 RAID storage system. Each stripe comprises 8 positions, and stripe information for each position may be stored using the data structure as shown in FIG. 7C. As shown in FIG. 8, entries 810, 820, . . . , 880 in the stripe information schematically show positions and other information of extents referenced in positions 1 to 8 in the stripe.

Hereinafter, description will be presented to how to manage the storage system based on the extent information and the stripe information. In one embodiment of the present invention, the managing the storage system based on the extent information and the stripe information comprises: in response to receiving a query about a target storage device in the group of storage devices, returning a state of the target storage device based on the extent information.

The state of a given storage device in the storage system may be conveniently queried based on the extent information of the present invention. For example, when receiving a query command to query a specified target storage device, based on the extent information it is possible to fast return how many extents in the target storage device have been consumed, how many extents are available, how many extents are dead and how many extents have potential failures, and further based on a state field in the extent information it is possible to fast look up where these extents are located respectively.

In one embodiment of the present invention, the managing the storage system based on the extent information and the stripe information comprises: in response to receiving a query on a target stripe among the first number of stripes, returning the state of the target stripe based on the stripe information. The state of a certain stripe in the storage system may be conveniently queried based on the stripe information according to the present invention. For example, when a query command to query a specified stripe is received, states of extents in various positions in the stripe may be fast returned based on the stripe information.

In the running process of the data center, storage devices in the data center might fail. For example, when a storage device fails, storage systems served by various extents in the failing device will face the problem of recovery. Hereinafter, an introduction will be presented to how to perform recovery operations, by taking one extent in a failing device for example.

In one embodiment of the present invention, the managing the storage system based on the extent information and the stripe information comprises: in response to detecting a target storage device in the group of storage devices has failed, with respect to one target extent in the target storage device, determining a target stripe associated with the target extent based on the extent information; selecting a free extent from the group of storage devices; writing data to the selected free extent based on data in other extent included in the target stripe.

Figure 9:
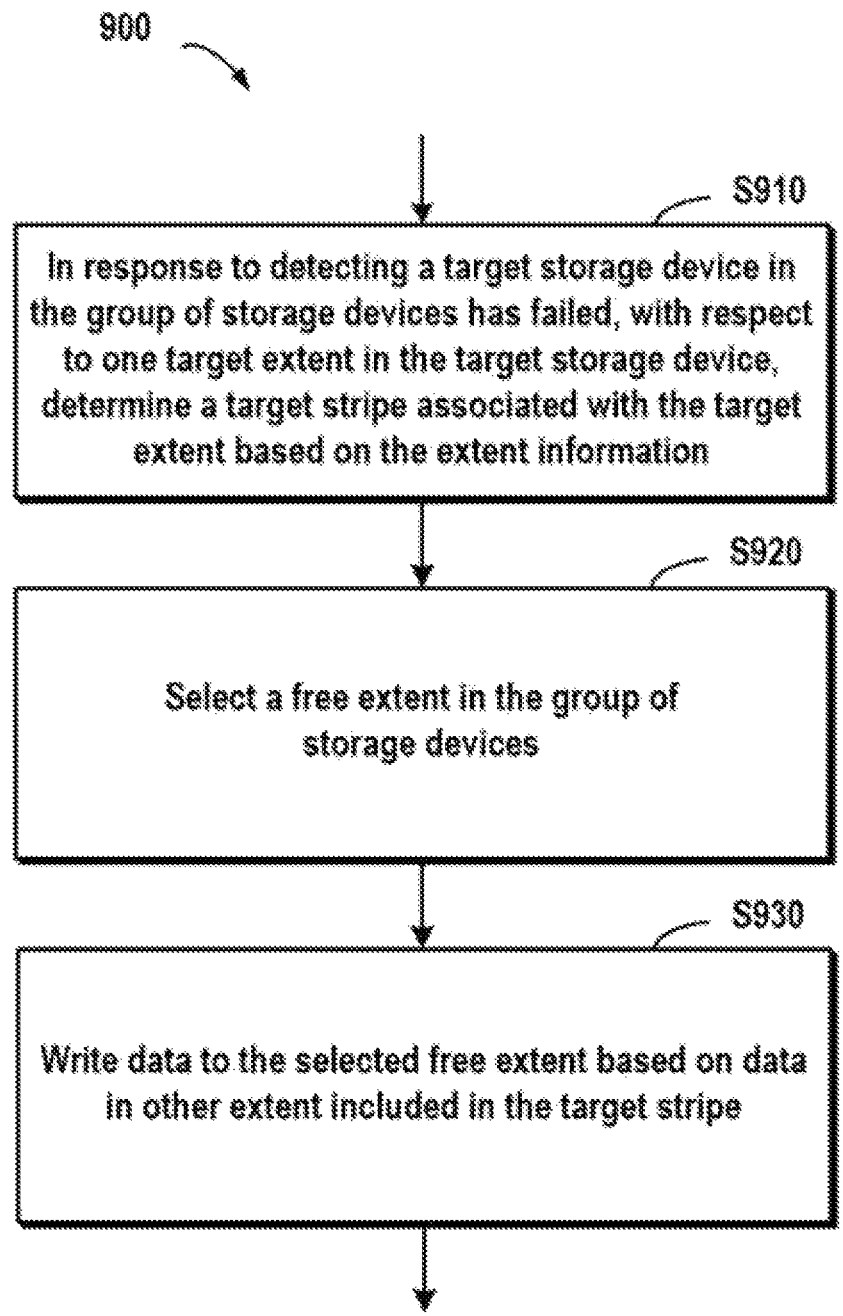
FIG. 9 schematically illustrates a flowchart of a method for performing recovery operations in a storage system according to one embodiment.

FIG. 9 schematically shows a flowchart 900 of a method for performing recovery operations in a storage system according to one embodiment of the present invention. In step S910, in response to detecting a target storage device in the group of storage devices has failed, with respect to one target extent in the target storage device, a target stripe associated with the target extent is determined based on the extent information. In this step, first a stripe referencing a failing extent is found in the storage system. Next, in step S920 a free extent is selected from the group of storage devices. In this step, one extent may be selected from extents whose states read "FBE_EXTENT_POOL_DISK_EXTENT_STATE_FREE" in the extent information to be used as a free extent. Then in step S930 data is written to the selected free extent based on data in other extent included in the target stripe. The recovery process in step S930 may be similar to that in the prior art.

In this embodiment, the number of storage devices that are allowed to fail is related to the standard used by the storage system. For example, in R6 RAID using P parity and Q parity, two storage devices are allowed to fail simultaneously, whereas in R5 RAID using P parity, only one storage device is allowed to fail. When more storage devices fail, this might make data unrecoverable.

Figure 10:
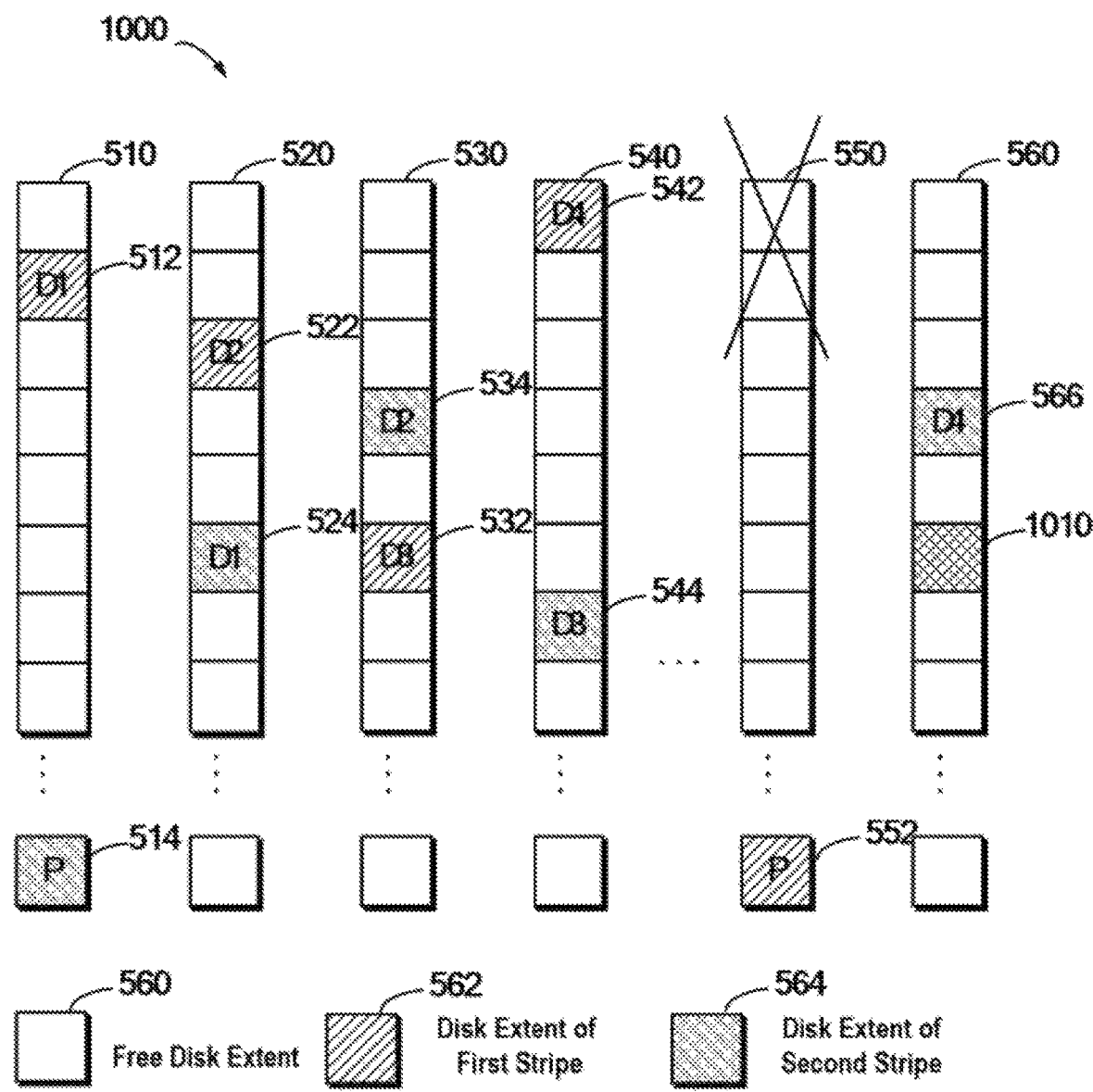
FIG. 10 schematically illustrates a block diagram of performing recovery operations in a storage system according to one embodiment.

In order to ensure extents in one stripe come from different storage devices, when selecting a free extent, a storage device other than any storage device referenced by the stripe needs to be selected from multiple storage devices in the data center. Specifically, in one embodiment of the present invention, the selecting a free extent from the group of storage devices comprises: selecting a standby storage device from the group of storage devices, the standby storage device differing from a storage device where any extent included in the target stripe is located; and selecting the free extent in the standby storage device. With reference to FIG. 10, detailed description is now presented to how to select the free extent.

FIG. 10 schematically shows a block diagram 1000 of performing recovery operations in a storage system according to one embodiment. As shown in FIG. 10, continue the example in FIG. 5. Suppose the storage device 550 fails and becomes offline. At this point, as seen from the extent information, the extent 552 in the storage device 550 is referenced by a first stripe in the storage system, and then a free extent needs to be selected from other normally operating storage device in the data center.

Since the extents D1 512, D2 522, D3 532 and D4 542 in other positions of the first stripe are respectively located at the storage devices 510, 520, 530 and 540, when selecting a standby storage device, the storage devices 510 to 540 cannot be selected. As shown in FIG. 10, the storage device 560 may be used as a standby storage device, and a free extent (e.g. the extent 1010) may be selected to replace the extent 552.

After data in the failing extent 552 is recovered from other extent in the first stripe, and the recovered data is written to the free extent 1010, the extent information and the stripe information may further be updated accordingly. Specifically, the managing the storage system based on the extent information and the stripe information further comprises: updating the extent information and the stripe information based on the selected free extent.

Continue the example in FIG. 10. Extent information associated with the extent 1010 may be updated to indicate the extent is referenced by the first stripe of the storage system; stripe information associated with the position of P parity in the first stripe of the storage system may be updated to reference the extent 1010 in the storage device 560.

Note though the recovery process has been described above by taking only one extent 552 in the failing storage device 550 for example, when in the failing device 550 there is a further failing extent serving a further stripe, the data in the further failing extent may be recovered concurrently with recovering data in the failing extent 552, in a similar way as described above.

In one embodiment of the present invention, the managing the storage system based on the extent information and the stripe information further comprises: with respect to a second target extent in the target storage device, determining a second target stripe associated with the second target extent based on the extent information; selecting a second free extent from the group of storage devices; and writing data to the selected second free extent based on data in other extent included in the second target stripe.

Note with the method of the present invention, when concurrently recovering data in multiple failing extents in a failing storage device, recovered data may be concurrently written to free extents selected from different storage devices. Therefore, recovery may be concurrently performed to different extents, and further efficiency of data recovery operations may be improved greatly.

In one embodiment of the present invention, additional identification information may be set for facilitating management of the storage system. Specifically, the managing the storage system based on the extent information and the stripe information further comprises: generating an indicator indicating the target extent in the target stripe is being rebuilt; and generating an indicator indicative of progress on rebuilding the target extent based on progress on writing data to the selected free extent.

Figure 11A:
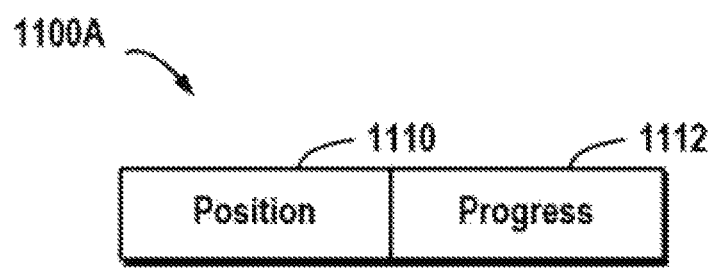
FIGS. 11A and 11B schematically illustrate a data structure of a rebuilding/copy indicator according to one embodiment.
Figure 11B:
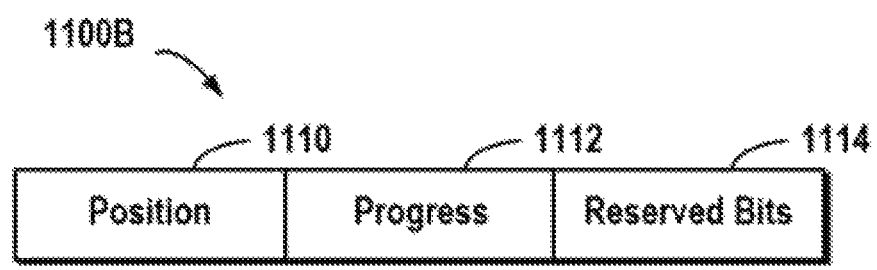

In this embodiment, an additional data structure may be set to describe the above indicators. FIGS. 11A and 11B schematically show data structures 1100A and 1100B of a rebuilding/copy indicator according to one embodiment. As shown in FIG. 11A, the rebuilding/copy indicator may comprise: a position field (e.g. 4 bits) for indicating at which position in the stripe an extent is being rebuilt/copied; and a progress field 1112 (e.g. 12 bits) for indicating progress that the extent in the position 1110 has been rebuilt/copied. In addition, as shown in FIG. 11B, besides the two fields 1110 and 1112 shown in FIG. 11A, the indicator may further comprise reserved bits 1114 (e.g. 16 bits) for use in future extension.

Based on different standards used by the storage system, different numbers of indicators may be set for each stripe. For example, in the R6 RAID storage system, since two storage devices are allowed to fail simultaneously, two indicators may be set to indicate positions of extents in failing storage devices. For another example, in the R5 RAID storage system, since only one storage device is allowed to fail, one indicator may be set to indicate positions of extents in the failing storage device.

In one embodiment of the present invention, the managing the storage system based on the extent information and the stripe information comprises: in response to receiving a copy command to copy a target extent in a target stripe, generating an indicator indicating the target extent in the target stripe is being copied; and generating an indicator indicative of progress on copying the target extent.

The data structure of the indicator for copy operation is the same as that of the indicator for rebuilding operation, so the copy indicator and the rebuilding indicator can be reused. The difference between the copy operation and the rebuilding operation is if two extents simultaneously perform copy, a complex situation will be caused. Therefore, in one embodiment of the present invention, it may be restricted that one extent in the stripe is allowed to perform copy.

In one embodiment of the present invention, when a command to delete the storage system is received, extents referenced by the storage system may be found based on the stripe information and the extent information, and operations performed accordingly. Specifically, the managing the storage system based on the extent information and the stripe information comprises: in response to receiving a command to delete the storage system, with respect to a stripe among the first number of stripes, determining the second number of extents included in the stripe based on the stripe information; clearing information associated with the determined second number of extents from the extent information; and clearing the stripe information.

Delete operation may be performed to each extent in each stripe in the storage system. An introduction will be presented below to the delete process by taking only one target extent in one stripe for example. Regarding a target extent, information associated with the target extent may be cleared from the extent information. After clearing extent information associated with all extents in a stripe, stripe information associated with the stripe may then be cleared.

Various embodiments implementing the method of the present invention have been described above with reference to the accompanying drawings. Those skilled in the art may understand the method may be implemented in software, hardware or a combination of software and hardware. Moreover, those skilled in the art may understand by implementing various steps in the above method in software, hardware or a combination of software and hardware, there may be provided a device based on the same invention concept. Even if the device has the same hardware structure as a general-purpose processing device, the functionality of software contained therein makes the device manifest distinguishing properties from the general-purpose processing device, thereby forming a device of the various embodiments of the present invention. The device described in the present invention comprises several means or modules, which are configured to execute corresponding steps. Upon reading this specification, those skilled in the art may understand how to write a program for implementing actions performed by these means or modules. Since the device is based on the same invention concept as the method, the same or corresponding implementation details are also applicable to means or modules corresponding to the method. As a detailed and complete description has been presented above, it might be ignored below.

Figure 12:
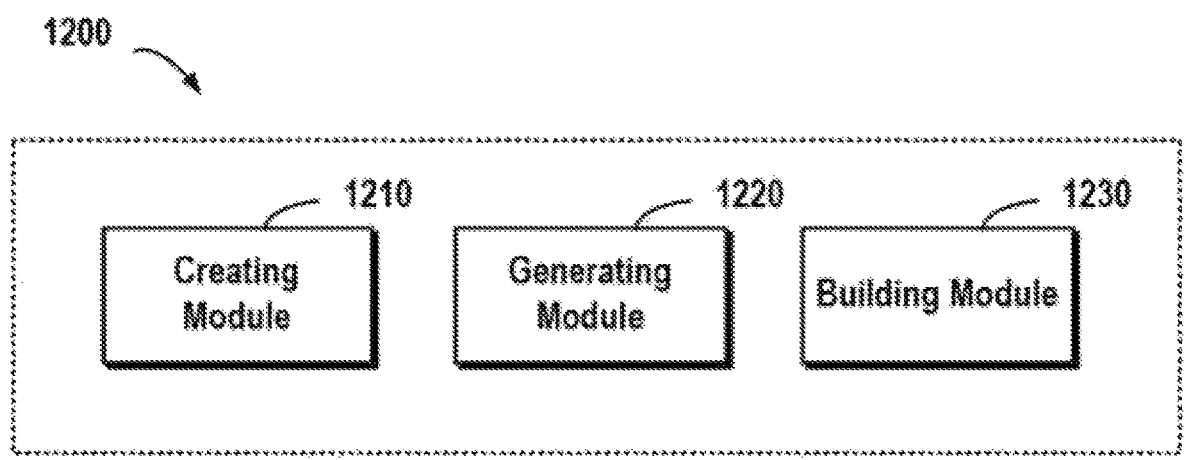
FIG. 12 schematically illustrates a block diagram of a device for managing a storage system according to one embodiment of the present invention.

FIG. 12 schematically shows a block diagram 1200 of a device for managing a storage system according to one embodiment of the present invention. Specifically, there is proposed a device for managing a storage system, the device comprising: a creating module 1210 configured to create a storage system including a first number of stripes, where each of the first number of stripes includes a second number of extents, and each of the second number of extents is distributed over a different storage device in a group of storage devices; a generating module 1220 configured to, with respect to a stripe among the first number of stripes, generate stripe information descriptive of a mapping relation between the second number of extents included in the stripe and the different storage devices in the group of storage devices; and a building module 1230 configured to, with respect to a storage device where an extent among the second number of extents is located, build extent information about a mapping relation between an extent in the storage device and the stripe.

In one embodiment of the present invention, the creating module 1210 is further configured to: with respect to each stripe among the first number of stripes, select a second number of storage devices from the group of storage devices so that the selected second number of storage devices are uniformly distributed over the group of storage devices; and select an extent from each storage device among the second number of storage devices.

In one embodiment of the present invention, the generating module 1220 is further configured to: with respect to a stripe among the first number of stripes, add state information of the stripe to the stripe information.

In one embodiment of the present invention, the building module 1230 is further configured to: add state information of the extent to the extent information.

In one embodiment of the present invention, there is further comprised: a management module configured to manage the storage system based on the extent information and the stripe information.

In one embodiment of the present invention, the management module is further configured to: in response to receiving a query on a target storage device in the group of storage devices, return a state of the target storage device based on the extent information.

In one embodiment of the present invention, the management module is further configured to: in response to receiving a query on a target stripe among the first number of stripes, return a state of the target stripe based on the stripe information.

In one embodiment of the present invention, the management module is further configured to: in response to detecting a target storage device in the group of storage devices has failed, with respect to one target extent in the target storage device, determine a target stripe associated with the target extent based on the extent information; select a free extent in the group of storage devices; and write data to the selected free extent based on data in other extent included in the target stripe.

In one embodiment of the present invention, the management module is further configured to: select a standby storage device in the group of storage devices, the standby storage device differing from a storage device where any extent included in the target stripe is located; and select the free extent in the standby storage device.

In one embodiment of the present invention, the management module is further configured to: generate an indicator indicating the target extent in the target stripe is being rebuilt; and generate an indicator indicative of progress on rebuilding the target extent, based on progress on writing data to the selected free extent.

In one embodiment of the present invention, the management module is further configured to: update the extent information and the stripe information based on the selected free extent.

In one embodiment of the present invention, the management module is further configured to: with respect to a second target extent in the target storage device, determine a second target stripe associated with the second target extent based on the extent information; select a second free extent in the group of storage devices; and write data to the selected second free extent based on data in other extent included in the second target stripe.

In one embodiment of the present invention, the management module is further configured to: in response to receiving a copy command to copy a target extent in a target stripe, generate an indicator indicating the target extent in the target stripe is being copied; and generate an indicator indicative of progress on copying the target extent.

In one embodiment of the present invention, the management module is further configured to: in response to receiving a command to delete the storage system, with respect to a stripe among the first number of stripes, determine the second number of extents included in the stripe based on the stripe information; clear information associated with the determined second number of extents from the extent information; and clear the stripe information.

In one embodiment of the present invention, there is provided a system for managing a storage system, the system comprising: one or more processors; a memory coupled to at least one processor of the one or more processors; computer program instructions stored in the memory which, when executed by the at least one processor, cause the system to execute a method for managing a storage system, the method comprising: creating a storage system including a first number of stripes, each of the first number of stripes including a second number of extents, each of the second number of extents being distributed over a different storage device in a group of storage devices; with respect to a stripe among the first number of stripes, generating stripe information descriptive of a mapping relation between the second number of extents included in the stripe and the different storage devices in the group of storage devices; and with respect to a storage device where an extent among the second number of extents is located, building extent information about a mapping relation between an extent in the storage device and the stripe.

In one embodiment of the present invention, the computer program instructions further cause the system to: with respect to each stripe among the first number of stripes, select a second number of storage devices from the group of storage devices so that the selected second number of storage devices are uniformly distributed over the group of storage devices; and select an extent from each storage device among the second number of storage devices.

In one embodiment of the present invention, the computer program instructions further cause the system to: with respect to a stripe among the first number of stripes, add state information of the stripe to the stripe information.

In one embodiment of the present invention, the computer program instructions further cause the system to: add state information of the extent to the extent information.

In one embodiment of the present invention, the computer program instructions further cause the system to: manage the storage system based on the extent information and the stripe information.

In one embodiment of the present invention, the computer program instructions further cause the system to: in response to receiving a query on a target storage device in the group of storage devices, return a state of the target storage device based on the extent information.

In one embodiment of the present invention, the computer program instructions further cause the system to: in response to receiving a query on a target stripe among the first number of stripes, return a state of the target stripe based on the stripe information.

In one embodiment of the present invention, the computer program instructions further cause the system to: in response to detecting a target storage device in the group of storage devices has failed, with respect to one target extent in the target storage device, determine a target stripe associated with the target extent based on the extent information; select a free extent in the group of storage devices; and write data to the selected free extent based on data in other extent included in the target stripe.

In one embodiment of the present invention, the computer program instructions further cause the system to: select a standby storage device in the group of storage devices, the standby storage device differing from a storage device where any extent included in the target stripe is located; and select the free extent in the standby storage device.

In one embodiment of the present invention, the computer program instructions further cause the system to: generate an indicator indicating the target extent in the target stripe is being rebuilt; and generate an indicator indicative of progress on rebuilding the target extent, based on progress on writing data to the selected free extent.

In one embodiment of the present invention, the computer program instructions further cause the system to: update the extent information and the stripe information based on the selected free extent.

In one embodiment of the present invention, the computer program instructions further cause the system to: with respect to a second target extent in the target storage device, determine a second target stripe associated with the second target extent based on the extent information; select a second free extent in the group of storage devices; and write data to the selected second free extent based on data in other extent included in the second target stripe.

In one embodiment of the present invention, the computer program instructions further cause the system to: in response to receiving a copy command to copy a target extent in a target stripe, generate an indicator indicating the target extent in the target stripe is being copied; and generate an indicator indicative of progress on copying the target extent.

In one embodiment of the present invention, the computer program instructions further cause the system to: in response to receiving a command to delete the storage system, with respect to a stripe among the first number of stripes, determine the second number of extents included in the stripe based on the stripe information; clear information associated with the determined second number of extents from the extent information; and clear the stripe information.

In one embodiment of the present invention, there is provided a computer program product, tangibly stored on a non-transient computer readable medium and including machine executable instructions which, when being executed, cause the machine to execute steps of the method described above.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of managing a storage system, the method comprising:
    creating multiple RAID (Redundant Array of Independent Disks) arrays from a plurality of storage devices in the storage system;
    storing a data structure for a storage device of the plurality of storage devices, the data structure associating multiple extents of the storage device with respective RAID arrays to which the extents belong; and
    in response to detecting a failure of the storage device, accessing the data structure to identify multiple RAID arrays that require rebuilding.

2. The method of claim 1, wherein creating the data structure includes associating the multiple extents of the storage device with respective stripes of the respective RAID arrays.

3. The method of claim 2, wherein creating the data structure further includes associating the multiple extents of the storage device with respective states of the extents, and wherein the method further comprises updating one or more of the states of the extents as the states change.

4. The method of claim 2, wherein the data structure is a first data structure, and wherein the method further comprises storing a second data structure associated with a stripe listed in the first data structure.

5. The method of claim 4, wherein storing the second data structure includes identifying, for multiple positions of the stripe listed in the first data structure, respective extent identifiers that identify extents that store data at the respective positions of the stripe, and respective device identifiers that identify storage devices on which the identified extents are located.

6. The method of claim 5, wherein storing the second data structure further includes providing, for the multiple positions of the stripe, respective stripe states of the stripe, and wherein the method further comprises updating one or more of the stripe states as the stripe states change.

7. An apparatus for managing a storage system, the system comprising:
    one or more processors;
    a memory coupled to at least one processor of the one or more processors;
    computer program instructions stored in the memory which, when executed by the at least one processor, cause the system to execute a method, comprising:
        creating multiple RAID (Redundant Array of Independent Disks) arrays from a plurality of storage devices in the storage system;
        storing a data structure for a storage device of the plurality of storage devices, the data structure associating multiple extents of the storage device with respective RAID arrays to which the extents belong; and
        in response to detecting a failure of the storage device, accessing the data structure to identify multiple RAID arrays that require rebuilding.

8. The apparatus of claim 7, wherein creating the data structure includes associating the multiple extents of the storage device with respective stripes of the respective RAID arrays.

9. The apparatus of claim 8, wherein creating the data structure further includes associating the multiple extents of the storage device with respective states of the extents, and wherein the method further comprises updating one or more of the states of the extents as the states change.

10. The apparatus of claim 8, wherein the data structure is a first data structure, and wherein the method further comprises storing a second data structure associated with a stripe listed in the first data structure.

11. The apparatus of claim 10, wherein storing the second data structure includes identifying, for multiple positions of the stripe listed in the first data structure, respective extent identifiers that identify extents that store data at the respective positions of the stripe, and respective device identifiers that identify storage devices on which the identified extents are located.

12. The apparatus of claim 11, wherein storing the second data structure further includes providing, for the multiple positions of the stripe, respective stripe states of the stripe, and wherein the method further comprises updating one or more of the stripe states as the stripe states change.

13. A computer program product including a set of non-transitory, computer-readable media having instructions which, when executed by control circuitry of a computerized system, cause the control circuitry to perform a method of managing a storage system, the method comprising:
creating multiple RAID (Redundant Array of Independent Disks) arrays from a plurality of storage devices in the storage system;
storing a data structure for a storage device of the plurality of storage devices, the data structure associating multiple extents of the storage device with respective RAID arrays to which the extents belong; and
in response to detecting a failure of the storage device, accessing the data structure to identify multiple RAID arrays that require rebuilding.

14. The computer program product of claim 13, wherein creating the data structure includes associating the multiple extents of the storage device with respective stripes of the respective RAID arrays.

15. The computer program product of claim 14, wherein creating the data structure further includes associating the multiple extents of the storage device with respective states of the extents, and wherein the method further comprises updating one or more of the states of the extents as the states change.

16. The computer program product of claim 14, wherein the data structure is a first data structure, and wherein the method further comprises storing a second data structure associated with a stripe listed in the first data structure.

17. The computer program product of claim 16, wherein storing the second data structure includes identifying, for multiple positions of the stripe listed in the first data structure, respective extent identifiers that identify extents that store data at the respective positions of the stripe, and respective device identifiers that identify storage devices on which the identified extents are located.

18. The computer program product of claim 17, wherein storing the second data structure further includes providing, for the multiple positions of the stripe, respective stripe states of the stripe, and wherein the method further comprises updating one or more of the stripe states as the stripe states change.

* * * * *